UNITED STATES PATENT OFFICE.

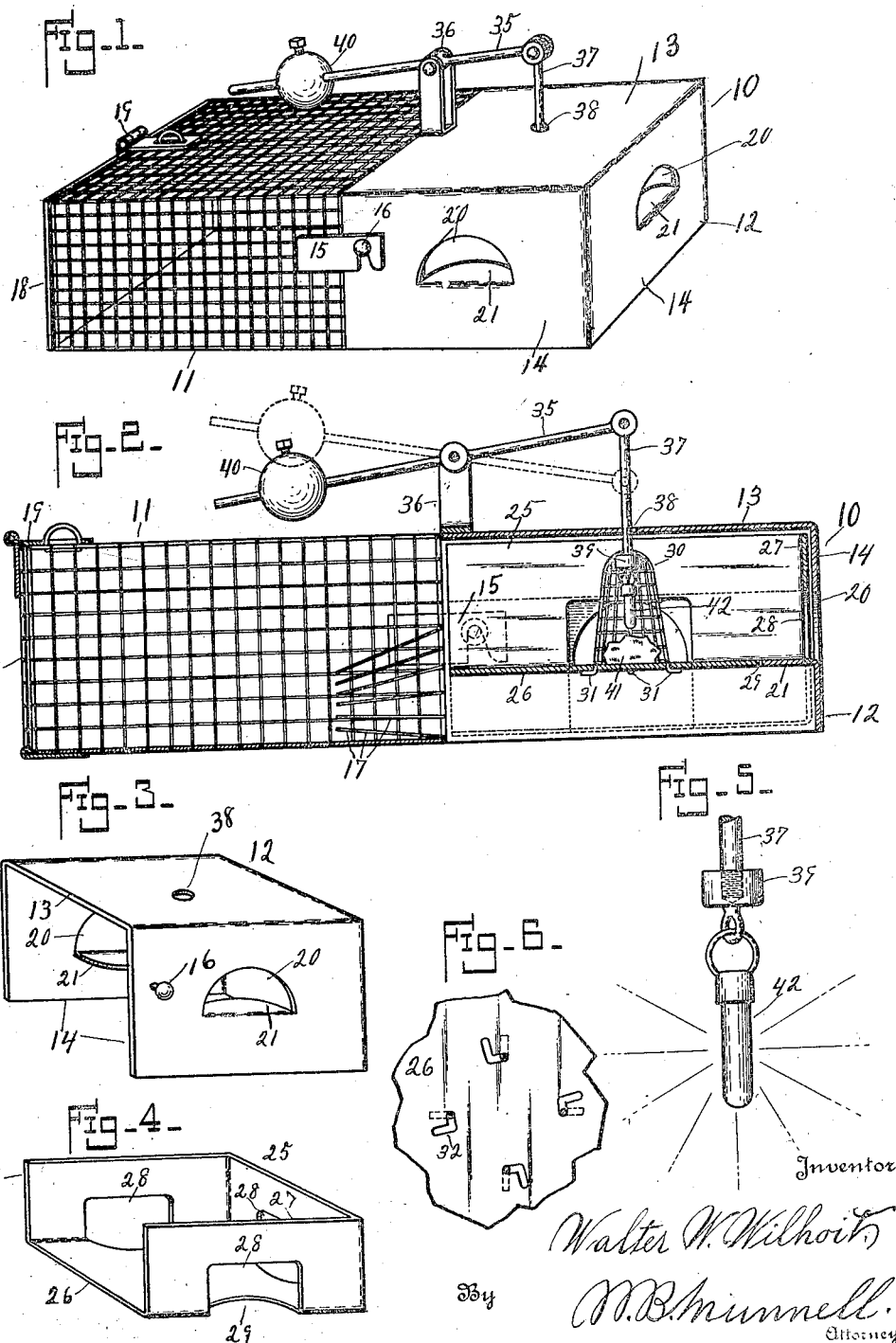

WALTER W. WILHOIT, OF LOUISVILLE, KENTUCKY.

TRAP.

1,375,196. Specification of Letters Patent. Patented Apr. 19, 1921.

Application filed January 26, 1920, Serial No. 354,223. Renewed March 5, 1921. Serial No. 449,865.

*To all whom it may concern:*

Be it known that I, WALTER W. WILHOIT, a citizen of the United States, residing at Louisville, county of Jefferson, and State of Kentucky, have invented certain new and useful Improvements in Traps, of which the following is a specification.

This invention relates to traps, more especially such as are adapted to catch rats, or other rodents.

An object of this invention is to provide a trap as characterized the normal position of the component parts of which is that of readiness for the entrapment of an animal, and which after each entrapment returns to normal position.

A further object is the provision of a trap which will be efficient in operation and durable in service.

With the foregoing and other objects in view, the invention consists of the novel construction and arrangement of parts illustrated in the accompanying drawing which forms a part of this specification, wherein is set forth an embodiment of the invention, but it is to be understood that such changes and modifications may be resorted to as come within the scope of the appended claims.

In the drawing, wherein similar reference numerals designate like parts in the several views, Figure 1, is a perspective view of an embodiment of the invention: Fig. 2, a longitudinal central vertical section of same: Fig. 3, a perspective view of the outer member of the trap: Fig. 4, a perspective view of the inner member of the trap: Fig. 5, a perspective view of a self luminous lure: and Fig. 6, a plan view of a portion of the floor of the inner member.

The invention comprises a trap —10— and an associated cage —11— detachably connected therewith. The trap comprises an outer box —12— consisting of a top —13— and wall —14— depending therefrom on three sides and is preferably formed of sheet metal, leaving the bottom and one side open. The cage is placed against the open side of the box and secured in position by suitable means such as latches —15— which are engaged with studs —16— on the sides of the trap. The cage is preferably formed of wire mesh and has an entrance guarded by wires —17— arranged in the shape of a funnel and pointing inward in the usual manner. The cage is also provided with a door —18— secured by suitable means such as a hasp —19—. The box is provided with an entrant opening —20— in each wall. A shelf —21— is positioned on the interior even with the lower edge of the opening 20, and is preferably formed by bending down the metal cut out to form the opening. A vertically movable inner member, or box —25— positioned within the trap, comprises a bottom, or floor —26— and walls —27— erected on three sides thereof, corresponding with the walls of the trap. The walls 27, are provided with openings —28— adapted to register with the openings 20, in the outer walls, when the inner member is in its normal or raised position. The floor of the inner member is provided with recesses —29— adapted to receive the shelves 21, when the member is in its normal or raised position. An open mesh wire frame —30— positioned centrally on the floor 26, is detachably associated therewith by means of angular projections, or feet, —31— which are passed through L shaped openings —32— in the floor and are engaged with the under face thereof by giving the frame a slight turn. An arm —35— is pivotally mounted intermediate its length on a support —36— on the top of the trap. A rod —37— pivotally connected to the forward end of the arm 35, depends through an aperture —38— in the top of the outer box and into the cage 30, where it is retained by means of a cap —39— secured on the end thereof. A weight —40— is slidably positioned on the rear portion of the arm 35. The weight serves to hold the inner member at the upper limit of its movement and may be adjusted therealong to adapt the trap for the different size animals. A suitable lure, or bait —41— as cheese, may be placed within the frame, and a self luminous lure —42— suspended from the cap 39. Self luminous pendants such as that illustrated are articles of commerce and as the construction thereof forms no part of this invention, it is not thought necessary to describe them. An animal attracted by the odor of the bait, or the glow of the pendent, will upon entering through an opening first place his fore feet upon a shelf 21 not until his body is entirely within the trap will it be far enough advanced on the floor for its weight to overcome the counter-poise and cause the inner member to descend with it. As the inner member goes down under the influence of the animal's weight, the portion of the inner walls, 27, immediately above the openings in the outer wall 28, will close said openings in the outer walls, and prevent the escape of the animal. In seeking a way out, the animal will pass through the entrance, into the cage, its return therefrom being prevented by the wires 17. As soon as the animal passes from off the floor 26, the weight will raise the inner member, and it will be ready for the entrapment of another animal.

Having thus described my invention so that those skilled in the art pertaining thereto can make and use the same, I claim:—

Claims.

1. In a trap, an outer box, an inner box, a frame detachably engaged with said inner box, a rod connected with said frame and extending upward through an opening in the top of the outer box, an arm fulcrumed on the top of the outer box, said rod pivotally connected to one end of said arm, a weight on the other end of the arm adapted to uphold the inner box, a wall of each box having an opening, said openings coinciding when the inner box is raised.

2. In a trap, an outer box, an inner box, a frame detachably engaged with said inner box, a rod connected with said frame and extending upward through an opening in the top of the outer box, an arm fulcrumed on the top of the outer box, said rod pivotally connected to one end of said arm, a weight on the other end of the arm adapted to uphold the inner box, a wall of each having an opening, said openings co-inciding when the inner box is raised and a luminous lure pendent within the frame.

WALTER W. WILHOIT.